United States Patent [19]
McLeod

[11] 4,304,389
[45] Dec. 8, 1981

[54] REMOTE CONTROL APPARATUS FOR HYDRAULICALLY ACTUATED DEVICES

[75] Inventor: Ronald W. McLeod, Naperville, Ill.

[73] Assignee: Union Oil Company of California, Brea, Calif.

[21] Appl. No.: 55,829

[22] Filed: Jul. 9, 1979

[51] Int. Cl.³ .................... F16K 31/12; F15B 13/02; F15B 13/044

[52] U.S. Cl. .................... 251/29; 251/30; 91/51; 91/459

[58] Field of Search ............... 251/28, 29, 130; 91/51, 91/461, 459; 137/DIG. 1

[56] References Cited

U.S. PATENT DOCUMENTS

| | | | |
|---|---|---|---|
| 2,969,808 | 1/1961 | Horlacher | 91/51 |
| 2,970,575 | 2/1961 | Stern | 91/51 |
| 3,370,513 | 2/1968 | Shore | 91/51 |
| 3,509,915 | 5/1970 | Janshen et al. | 137/637 |
| 3,698,580 | 10/1972 | Carlson et al. | 214/138 R |
| 3,721,357 | 3/1973 | Williamson | 214/138 R |
| 3,964,518 | 6/1976 | Hesse et al. | 137/625.64 |
| 4,143,851 | 3/1979 | Lange | 251/29 |

*Primary Examiner*—A. Michael Chambers
*Attorney, Agent, or Firm*—Dean Sandford; Daniel R. Farrell; Alan H. Thompson

[57] ABSTRACT

Apparatus including a manually operated electrical switch operably connected through electrical and pneumatic systems to a hydraulic system for remote manual control of hydraulically actuated devices, such as hydraulically actuated throttling valves. The apparatus is particularly useful as a remote manual override for malfunctioning automatic hydraulic controllers.

16 Claims, 1 Drawing Figure

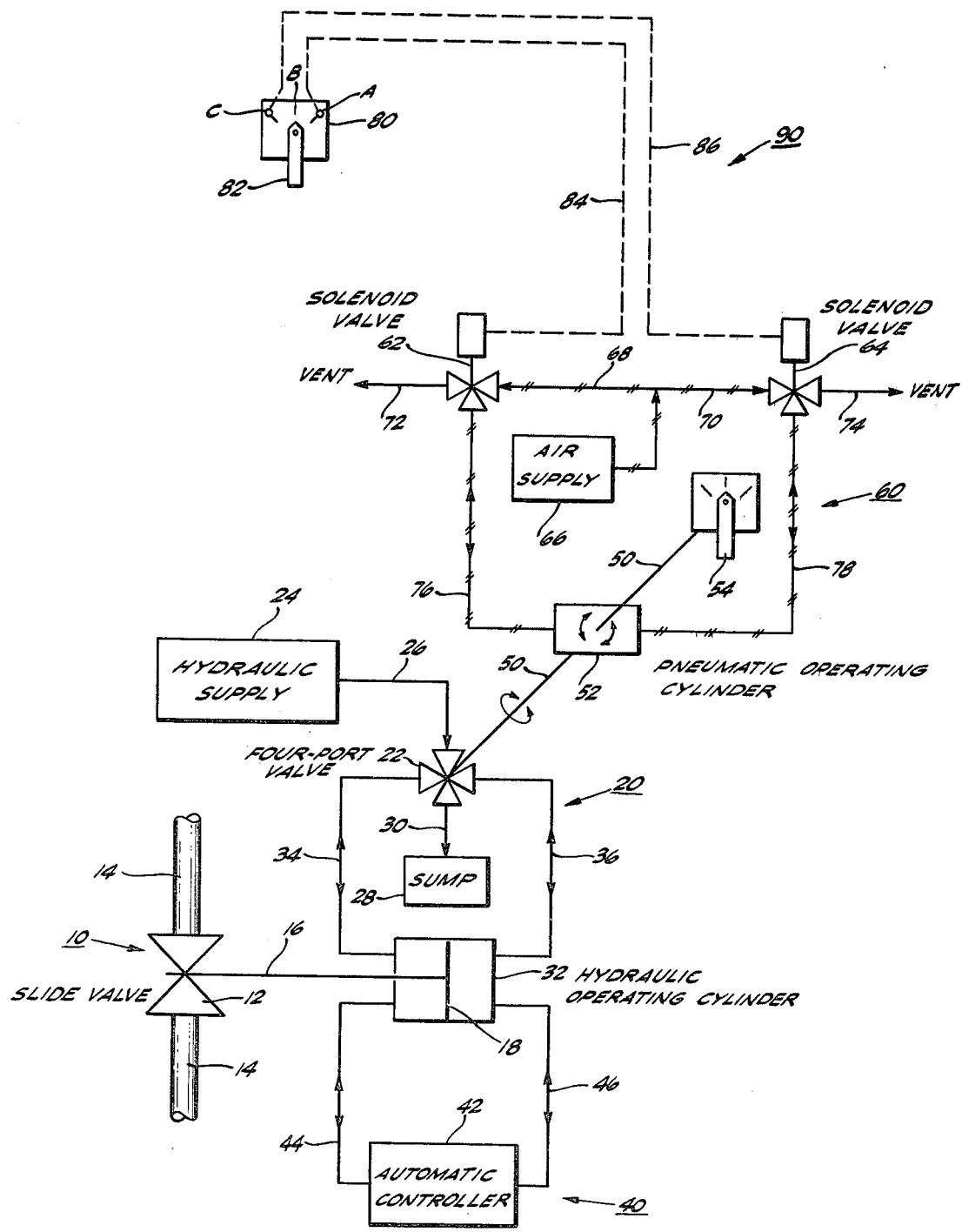

REMOTE CONTROL APPARATUS FOR HYDRAULICALLY ACTUATED DEVICES

BACKGROUND OF THE INVENTION

1. Field of the Invention

This invention relates to apparatus for controlling hydraulically actuated devices, and in particular to apparatus for remotely controlling hydraulically actuated devices, such as throttling valves.

2. Description of the Prior Art

The use of hydraulic actuator systems to mechanically adjust the position of levers, valve stems and the like is commonplace in a wide variety of activities. For example, fluid flow processes, such as refinery processes and other chemical processes, typically require one or more hydraulically actuated throttling valves to regulate the flow rate of fluids through fluid-conducting conduits. These processes typically require frequent or even substantially continuous repositioning of the throttling mechanism of the throttling valve in order to compensate for changes in liquid levels, pressures, fluid compositions and the like. While such repositioning can be done manually, usually the repositioning of the throttling mechanism is performed automatically by the hydraulic actuator system in response to a signal from an automatic controller. Under normal operating conditions automatic controllers can enhance the efficiency of the process unit of which they are a part.

However, during severe upsets of the process units or during normal start-up or shut-down operations, it is possible for automatic controllers to become unstable and fail to properly compensate for changes in the process conditions. In addition, automatic controllers occasionally malfunction even in an otherwise properly operating process unit. Under such circumstances, rather than aid in the control of the process, the automatic controller may actually hinder an operator's attempts to bring the process unit to the desired operating conditions. Accordingly, most automatic controllers can be inactivated and the throttling mechanism can be manually repositioned by an operator stationed at the throttling valve.

While these prior art methods for overriding a malfunctioning automatic controller may be suitable where there is sufficient manpower to attend the valve and the valve is readily accessible, as a practical matter, such override systems are not suitable in the more complex, highly automated process units of modern refineries and chemical plants. Besides having fewer operators to attend to the throttling valves, such process units generally have more throttling valves, at least several of which are not readily accessible from the central control room. Moreover, the same unit upsets which would require an operator to manually override a valve also require that more operator attention be given to other parts of the process unit in order to find and correct the cause of the upset. For these reasons even a relatively minor problem, such as a plugged hydraulic line between the automatic controller and the throttling valve, could force a complete shutdown of the process unit. For example, a large fluid catalytic cracking (FCC) unit may be shut down at a cost of $50,000 per day by the loss of control of a slide valve due to a malfunctioning automatic controller. Thus a need exists for an apparatus for remotely overriding malfunctioning automatic controllers so as to allow remote manual positioning of the hydraulically-actuated device.

Accordingly, a primary object of this invention is to provide an apparatus for remotely controlling hydraulically-actuated devices.

Another object of the invention is to provide an apparatus for remote manual override of a malfunctioning automatic control valve.

Yet another object of this invention is to provide a simple and effective remote control apparatus for positioning the throttling mechanism of a hydraulically-actuated throttling valve.

Still another object of this invention is to provide a readily installable remote control apparatus which is compatible with the existing control mechanisms of conventional hydraulically-actuated throttling valves.

Other objects, advantages and features of this invention will become apparent to those skilled in the art from the following description when taken in conjunction with the accompanying drawing.

SUMMARY OF THE INVENTION

Briefly, the invention provides an apparatus for remotely controlling hydraulically-actuated devices from a manually operated electrical switch mounted at a convenient location, such as a central control room. The electrical switch is operably connected successively through electrical and pneumatic systems to a hydraulic actuator system adapted to control the hydraulically-actuated device in response to the position of the electrical switch.

In a preferred embodiment, the apparatus of this invention is adapted to remotely control the position of a throttling mechanism of a throttling valve and includes (1) a hydraulic operating cylinder which mechanically positions the throttling mechanism in response to a differential hydraulic pressure selectively controlled by a hydraulic control valve; (2) a pneumatic operating cylinder which mechanically adjusts the hydraulic control valve; and (3) first and second solenoid valves adapted to vent pneumatic fluid from a first end and an opposed second end, respectively, of the pneumatic operating cylinder and thereby adjust the hydraulic control valve in response to the position of the electrical switch.

This invention provides a relatively simple and inexpensive apparatus for remotely controlling hydraulically actuated throttling devices. The remote control apparatus of this invention is easy to install and maintain, and is adapted for use with conventional hydraulically actuated devices. The apparatus can be used to temporarily override malfunctioning automatic controllers, as well as for prolonged manual control of hydraulically actuated devices. The use of the apparatus of this invention to remotely control throttling valves allows manual control of a plurality of throttling valves from a single location, such as a central control room, thereby reducing the number of operators required to attend to these valves. The apparatus of this invention can be designed to be fail-safe and is compatible with conventional manual override systems mounted on conventional throttling valves. The apparatus allows remote manual control of all of the throttling valves of a process unit from a central control room, thereby providing for immediate and more precise control of the remotely controlled valves as compared to prior art apparatus.

BRIEF DESCRIPTION OF THE DRAWING

The invention will be more readily understood by reference to the drawing which is a schematic diagram illustrating one embodiment of the remote control apparatus of this invention.

DETAILED DESCRIPTION OF THE INVENTION

The apparatus of this invention is suitable for remotely controlling hydraulically actuated devices in a wide variety of processes, and while the invention will hereinafter be described with respect to the remote control of a slide valve, it will be understood, of course, that the apparatus is also suited to the remote control of other throttling valves, such as a butterfly valve, a ball valve, a needle valve or the like, as well as other hydraulically actuated devices with only minor modifications in the hydraulic system as will be apparent to those skilled in the art.

Referring to the drawing, a conventional slide valve, shown generally as 10, includes valve body 12 fluid-tightly mounted in conduit 14, and reciprocatable slide element 16 fluid-tightly and slideably mounted in valve body 12. The rate of fluid and/or solid flow through conduit 14 is regulated by positioning slide element 16 within valve body 12 so as to provide the desired cross-sectional area for flow through valve body 12.

Piston 18 is fixedly attached to the end of slide element 16 and is reciprocated by means of a first hydraulic positioning system, shown generally as 20. First hydraulic system 20 includes (1) four-port hydraulic control valve 22, (2) hydraulic supply 24 fluid-tightly connected via conduit 26 to one port of control valve 22; (3) hydraulic sump 28 fluid-tightly connected via conduit 30 to another port of control valve 22; and (4) hydraulic operating cylinder 32 mounted on or near valve body 12, and having an inboard end and an opposed outboard end fluid-tightly connected via conduits 34 and 36, respectively, to the remaining two ports of control valve 22. Piston 18 is reciprocatably mounted within operating cylinder 32 and is adapted to be progressively repositioned within operating cylinder 32 in response to a differential hydraulic pressure between the inboard and outboard ends of operating cylinder 32.

In the embodiment shown in the drawing, a differential hydraulic pressure can be applied across operating cylinder 32 by means of first hydraulic positioning system 20 and/or by a second hydraulic positioning system, shown generally as 40, comprised of automatic controller 42 fluid-tightly connected to the inboard and outboard ends of operating cylinder 32 by conduits 44 and 46, respectively. Application of a positive differential hydraulic pressure between the inboard and outboard ends of operating cylinder 32 forces piston 18 away from valve 10 thereby progressively opening slide valve 10 to allow an increased flow rate through conduit 14. Conversely a negative differential pressure between the inboard and outboard ends of operating cylinder 32 forces piston 18 towards valve 10 thereby progressively closing slide valve 10. A neutral differential pressure maintains piston 18 in a stationary position.

Three-position valve stem 50 is fixedly coupled to control valve 22 and is adapted to adjust control valve 22 so as to interconnect conduits 26, 30, 34 and 36 in three different combinations. Valve stem 50 is rotatably adjustable to each of the three valve stem positions by means of pneumatic operating cylinder 52 and/or manual control stick 54 which are mechanically coupled to valve stem 50. In the first valve stem position, conduit 26 is connected to conduit 34, and conduit 36 is connected to conduit 30 with the result that pressurized hydraulic fluid flows from hydraulic supply 24 through conduits 26 and 34 into the inboard end of operating cylinder 32 to force piston 18 away from valve 10, and hydraulic fluid displaced by piston 18 from operating cylinder 32 flows through conduits 36 and 30 to sump 28. Typically, the hydraulic fluid from sump 28 will be returned through a conduit, not shown, to hydraulic supply 24 for reuse. In the second valve stem position, conduits 34 and 36 are both connected to hydraulic supply 24 via conduit 26 thereby equalizing the pressures on each side of piston 18 to maintain the position of piston 18 within operating cylinder 32. In the third valve stem position, conduit 26 is connected to conduit 36, and conduit 34 is connected to conduit 30 with the result that piston 18 is forced towards valve 10 by the flow of hydraulic fluid from hydraulic supply 24 through conduits 26 and 36 into the outboard end of operating cylinder 32.

Valve stem 50 is adjustable between the three valve stem positions by means of a pneumatic system, shown generally as 60, in response to electrical signals from an electrical system, shown generally as 90. Pneumatic system 60 includes (1) three-port solenoid valves 62 and 64; (2) a source of pressurized pneumatic fluid, such as air supply 66, fluid-tightly connected in parallel to one port of each of solenoid valves 62 and 64 via conduits 68 and 70, respectively; (3) vents 72 and 74 connected to the second ports of solenoid valves 62 and 64, respectively; and (4) pneumatic operating cylinder 52 coupled to valve stem 50 and having a first end and an opposed second end fluid-tightly connected via conduits 76 and 78 to the third ports of solenoid valves 62 and 64, respectively. A suitable pneumatic operating cylinder is the three-position pneumatic actuator marketed by the Barksdale Division of DeLaval Turbine of Los Angeles, Calif.

Electrical system 90 includes three-position electrical switch 80 mounted in a convenient location, such as a central control room (not shown), spaced from the location of valve 10. Electrical switch 80 has manual stick 82 for switching between the first, second and third switch positions of switch 80, shown as switch positions A, B and C, respectively. Electrical conductors 84 and 86 electrically connect switch positions A and C, respectively, to solenoid valves 62 and 64, respectively.

When manual stick 82 is positioned in switch position A, an electrical signal transmitted via conductor 84 energizes solenoid valve 62 to thereby connect conduit 76 to vent 72 so as to vent pneumatic fluid from the first end of operating cylinder 52 and cause operating cylinder 52 to rotate valve stem 50 to the first valve stem position. When manual stick 82 is positioned in switch position B, no electrical signals are transmitted; deenergized solenoid valve 62 connects air supply 66 through conduits 68 and 76 to the first end of operating cylinder 52 and deenergized solenoid valve 64 connects air supply 66 through conduits 70 and 78 to the second end of operating cylinder 52, thereby causing valve stem 50 to rotate into the second valve stem position. And when manual stick 82 is positioned in switch position C, an electrical signal transmitted via conductor 86 energizes solenoid valve 64 to thereby connect conduit 78 to vent 74 so as to vent pneumatic fluid from the second end of operating cylinder 52 and cause operating cylinder 52 to rotate valve stem 50 to the third valve stem position. Preferably electrical switch 80 is spring-loaded or otherwise adapted to return manual stick 82 to switch position B, i.e., the neutral position, when manual stick 82 is released.

The apparatus of this invention functions in response to the manipulation of manual stick 82. In order to progressively open slide valve 10, manual stick 82 is switched to switch position A with the result that an electrical signal is transmitted via conductor 84 to energize solenoid valve 62 thereby venting pneumatic fluid from the first end of operating cylinder 52 so as to rotate valve stem 50 to the first valve stem position. In this manner, hydraulic supply 24 is connected through conduits 26 and 34 to the inboard end of hydraulic operating cylinder 32 so as to force piston 18 away from slide valve 10 thereby progressively opening slide valve 10. The hydraulic fluid forced out of the outboard end of operating cylinder 32 flows through conduits 36 and 30 to sump 28.

In order to maintain slide element 16 in a stationary position, manual stick 82 is switched to switch position B with the result that solenoid valves 62 and 64 remain deenergized and air supply 66 applies pneumatic fluid pressure equally to the first and second ends of operating cylinder 52 so as to rotate valve stem 50 to the second valve stem position. In this manner, hydraulic supply 24 is connected through conduits 26 and 34 to the inboard end of operating cylinder 32 and through conduits 26 and 36 to the outboard end of operating cylinder 32 so as to apply equal pressure to each side of piston 18 and thereby maintain the position of slide element 16. No hydraulic fluid flows to sump 28.

In order to progressively close slide valve 10, manual stick 82 is switched to switch position C with the result that an electrical signal is transmitted via conductor 86 to energize solenoid valve 64 thereby venting pneumatic fluid from the second end of operating cylinder 52 so as to rotate valve stem 50 to the third valve stem position. In this manner, hydraulic supply 24 is connected through conduits 26 and 36 to the outboard end of hydraulic operating cylinder 32 so as to force piston 18 towards slide valve 10 thereby progressively closing slide valve 10. The hydraulic fluid forced out of the inboard end of operating cylinder 32 flows through conduits 34 and 30 to sump 28.

The apparatus of this invention can be used to position slide element 16 in any position from fully open to completely closed, as well as any intermediate position. Optionally, a conventional slide element position indicating device, not shown, can be provided in combination with the apparatus of this invention to allow the operator to remotely monitor the position of slide element 16 and any changes therein.

The apparatus illustrated in the drawing is designed to be fail-safe, i.e., the failure of electrical power or failure of the hydraulic or pneumatic fluid supplies will not cause an undesired change in the position of slide element 16. In the event of an electrical power failure, solenoid valves 62 and 64 remain deenergized so as to connect air supply 66 through conduits 68 and 76 to the first end of operating cylinder 52 and through conduits 70 and 78 to the second end of operating cylinder 52, thereby returning valve stem 50 to the second valve stem position and maintaining slide element 16 stationary. In the event of a failure of air supply 66, the position of valve stem 50 will revert to the second valve stem position since the pneumatic pressure on the ends of operating cylinder 52 will be equalized. In the event of an electrical and/or pneumatic failure, slide valve 10 can still be controlled by means of manual control stick 54. A failure of hydraulic supply 24 will leave the position of slide element 16 unchanged because the hydraulic pressure on the ends of operating cylinder 32 will remain or become equalized.

While particular embodiments of the invention have been described, it will be understood, of course, that the invention is not limited thereto since many obvious modifications can be made and it is intended to include within this invention any such modifications as will fall within the scope of the appended claims.

Having now described the invention, I claim:

1. A remote control apparatus for positioning a hydraulically-actuated mechanism adapted to move progressively in a first direction, remain stationary and move progressively in a second direction in response to varied hydraulic pressures applied to a first end and/or an opposed second end of a hydraulic operating means mechanically coupled to said mechanism, said control apparatus comprising:

a hydraulic control valve having a valve stem with first, second and third valve stem positions;

first hydraulic means fluid-tightly interconnecting said hydraulic control valve and said hydraulic operating means, said first hydraulic means being adapted (a) to apply a higner pressure to said first end of said hydraulic operating means than is applied to said second end of said hydraulic operating means when said valve stem is in said first valve stem position, thereby progressively opening said mechanism, (b) to equalize the pressures applied to said first and second ends of said hydraulic operating means when said valve stem is in said second valve stem position, thereby maintaining said mechanism in a stationary position, and (c) to apply a higher pressure to said second end of said hydraulic operating means when said valve stem is in said third valve stem position, thereby progressively closing said mechanism;

pneumatic means comprising (1) a pneumatic operating means mechanically coupled to said valve stem and adapted to controllably adjust the position of said valve stem among said first, second and third valve stem positions in response to variations in a superatmospheric pneumatic pressure normally applied to a first end and an opposed second end of said pneumatic means, and (2) electronically controlled venting means fluid-tightly connected to said first and second ends of said pneumatic operating means;

a manually switchable electrical switch having first, second and third switch positions;

electrical means interconnecting said electrical switch and said venting means, said venting means being adapted to (a) vent pneumatic fluid from said second end of said pneumatic operating means to thereby adjust said valve stem to said first valve stem position when said electrical switch is in said first switch position, (b) prohibit venting of pneumatic fluid from said first and second ends of said pneumatic operating means to thereby adjust said valve stem to said second valve stem position when said electrical switch is in said second switch position, and (c) vent pneumatic fluid from said first end of said pneumatic operating means to thereby adjust said valve stem to said third valve stem position when said electrical switch is in said third switch position.

2. A remote control apparatus for positioning the throttling mechanism of a throttling valve fixedly mounted in a conduit at a first location, said throttling mechanism being adapted to progressively open, remain stationary and progressively close in response to varied hydraulic pressures applied to a first end and/or an opposed second end of a hydraulic operating means mechanically coupled to said throttling mechanism, said control apparatus comprising:

a hydraulic control valve having a valve stem with first, second and third valve stem positions;

first hydraulic means fluid-tightly interconnecting said hydraulic control valve and said hydraulic operating means, said first hydraulic means being adapted (a) to apply a higher pressure to said first end of said hydraulic operating means than is applied to said second end of said hydraulic operating means when said valve stem is in said first valve stem position, thereby progressively opening said throttling mechanism, (b) to equalize the pressures applied to said first and second ends of said hydraulic operating means when said valve stem is in said second valve stem position thereby maintaining said throttling mechanism in a stationary position, and (c) to apply a higher pressure to said second end of said hydraulic operating means when said valve stem is in said third valve stem position, thereby progressively closing said throttling mechanism;

pneumatic means comprising (1) a pneumatic operating means mechanically coupled to said valve stem and adapted to controllably adjust the position of said valve stem among said first, second and third valve stem positions in response to variations in a superatmospheric pneumatic pressure normally applied to a first end and an opposed second end of said pneumatic means, and (2) electronically controlled venting means fluid-tightly connected to said first and second ends of said pneumatic operating means;

a manually switchable electrical switch mounted at a second location spaced from said first location, said electrical switch having first, second and third switch positions;

electrical means interconnecting said electrical switch and said venting means, said venting means being adapted to (a) vent pneumatic fluid from said second end of said pneumatic operating means to thereby adjust said valve stem to said first valve stem position when said electrical switch is in said first switch position, (b) prohibit venting of pneumatic fluid from said first and second ends of said pneumatic operating means to thereby adjust said valve stem to said second valve stem position when said electrical switch is in said second switch position, and (c) vent pneumatic fluid from said first end of said pneumatic operating means to thereby adjust said valve stem to said third valve stem position when said electrical switch is in said third switch position.

3. A remote control apparatus for positioning the throttling mechanism of a throttling valve fixedly mounted in a fluid flow conduit at a first location, said throttling mechanism being adapted to progressively open, remain stationary and progressively close in response to varied hydraulic pressures applied to a first end and/or an opposed second end of a hydraulic operating means mechanically coupled to said throttling mechanism, said control apparatus comprising:

first hydraulic means comprising (1) a hydraulic control valve having a valve stem with first, second and third valve stem positions; (2) a source of pressurized hydraulic fluid; (3) a hydraulic fluid sump; and (4) conduit means fluid-tightly connecting said hydraulic control valve to said first and second ends of said hydraulic operating means and to the hydraulic fluid source and the hydraulic fluid sump, said first hydraulic means being adapted (a) to apply a higher pressure to said first end of said hydraulic operating means than is applied to said second end of said hydraulic operating means when said valve stem is in said first valve stem position, thereby progressively opening said throttling mechanism, (b) to equalize the pressures applied to said first and second ends of said hydraulic operating means when said valve stem is in said second valve stem position, thereby maintaining said throttling mechanism in a stationary position, and (c) to apply a higher pressure to said second end of said hydraulic operating means than is applied to said first end of said hydraulic operating means when said valve stem is in said third valve stem position, thereby progressively closing said throttling mechanism;

pneumatic means comprising (1) a pneumatic operating means mechanically coupled to said valve stem and adapted to adjust the position of said valve stem among said first, second and third valve stem positions in response to varied pneumatic pressures applied to a first end and/or an opposed second end of said pneumatic operating means, (2) a source of pressurized pneumatic fluid fluid-tightly connected to said first and second ends of said pneumatic operating means; and (3) electronically controlled venting means fluid-tightly connected to said first and second ends of said pneumatic operating means, said venting means being adapted to controllably vent pneumatic fluid from said first and second ends of said pneumatic operating means; and electrical control means comprising (1) a manually switchable electrical switch mounted at a second location spaced from said first location, said electrical switch having first, second and third switch positions, and (2) electrical conductor means interconnecting said electrical switch and said venting means, said electrical control means being adapted to (a) maintain pneumatic pressure on said first end of said pneumatic operating means and vent pneumatic fluid from said second end of said pneumatic operating means through said venting means to thereby adjust said valve stem to said first valve stem position when said electrical switch is in said first switch position, (b) prohibit venting of pneumatic fluid from said first and second ends of said pneumatic operating means to thereby adjust said valve stem to said second valve stem position when said electrical switch is in said second switch position, and (c) maintain pneumatic pressure on said second end of said pneumatic operating means and vent pneumatic fluid from said first end of said pneumatic operating means through said venting means to thereby adjust said valve stem to said third valve stem position when said electrical switch is in said third switch position.

4. A remote control apparatus for positioning a hydraulically-actuated mechanism adapted to move progressively in a first direction, remain stationary and move progressively in a second direction in response to varied hydraulic pressures applied to a first end and/or an opposed second end of a hydraulic operating means mechanically coupled to said mechanism, said control apparatus comprising:

first hydraulic means comprising (1) a hydraulic control valve having a valve stem with first, second and third valve stem positions; (2) a source of pressurized hydraulic fluid; (3) a hydraulic fluid sump; and (4) conduit means fluid-tightly connecting said hydraulic control valve to said first and second ends of said hydraulic operating means and to the hydraulic fluid source and the hydraulic fluid sump, said first hydraulic means being adapted (a) to apply a higher pressure to said first end of said hydraulic operating means than is applied to said second end of said hydraulic operating means when said valve stem is in said first valve stem position, thereby progressively opening said mechanism, (b) to equalize the pressures applied to said first and second ends of said hydraulic operating means when said valve stem is in said second valve stem position, thereby maintaining said mechanism in a stationary position, and (c) to apply a higher pressure to said second end of said hydraulic operating means than is applied to said first end of said hydraulic operating means when said valve stem is in said third valve stem position, thereby progressively closing said mechanism;

pneumatic means comprising (1) a pneumatic operating means mechanically coupled to said valve stem and adapted to adjust the position of said valve stem among said first, second and third valve stem positions in response to varied pneumatic pressures applied to a first end and/or an opposed second end of said pneumatic operating means, (2) a source of pressurized pneumatic fluid fluid-tightly connected to said first and second ends of said pneumatic operating means; and (3) electronically controlled venting means fluid-tightly connected to said first and second ends of said pneumatic operating means, said venting means being adapted to controllably vent pneumatic fluid from said first and second ends of said pneumatic operating means; and electrical control means comprising (1) a manually switchable electrical switch mounted at a second location spaced from said first location, said electrical switch having first, second and third switch positions, and (2) electrical conductor means interconnecting said electrical switch and said venting means, said electrical control means being adapted to (a) maintain pneumatic pressure on said first end of said pneumatic operating means and vent pneumatic fluid from said second end of said pneumatic operating means through said venting means to thereby adjust said valve stem to said first valve stem position when said electrical switch is in said first switch position, (b) prohibit venting of pneumatic fluid from said first and second ends of said pneumatic operating means to thereby adjust said valve stem to said second valve stem position when said electrical switch is in said second switch position and (c) maintain pneumatic pressure on said second end of said pneumatic operating means and vent pneumatic fluid from said first end of said pneumatic operating means through said venting means to thereby adjust said valve stem to said third valve stem position when said electrical switch is in said third switch position.

5. The apparatus defined in claim 1, 2, 3 or 4 further comprising an automatic control means adapted to automatically control said mechanism independently of said first hydraulic means, said pneumatic means and said electrical means; and a second hydraulic means fluid-tightly interconnecting said automatic control means and said hydraulic operating means, said second hydraulic means being adapted to apply varied hydraulic pressures to said first and/or second ends of said hydraulic operating means to thereby cause said mechanism to progressively open, maintain stationary, or progressively close in response to signals from said automatic control means.

6. The apparatus defined in claim 1 or 2 wherein said hydraulic means and hydraulic control valve are adapted such that (a) said first end of said hydraulic operating means is in fluid communication with a source of pressurized hydraulic fluid, and said second end of said hydraulic operating means is in fluid communication with a hydraulic fluid sump when said valve stem is in said first valve stem position, (b) said first and second ends of said hydraulic operating means are in fluid communication with said source of pressurized hydraulic fluid when said valve stem is in said second valve stem position, and (c) said second end of said hydraulic operating means is in fluid communication with said source of pressurized hydraulic fluid, and said first end of said hydraulic operating means is in fluid communication with said hydraulic fluid sump when said valve stem is in said third valve stem position.

7. The apparatus defined in claim 1 or 2 wherein said pneumatic means includes a pneumatic operating means mounted on said control valve and adapted to controllably adjust the position of said valve stem among said first, second and third valve stem positions.

8. The apparatus defined in claim 7 wherein said pneumatic means further includes (1) a source of pressurized pneumatic fluid; (2) at least one vent; (3) a first solenoid valve adapted to connect said first end of said pneumatic operating means (a) to said source of pressurized pneumatic fluid when said first solenoid valve is deenergized, and (b) to said vent when said first solenoid valve is energized; and (4) a second solenoid valve adapted to connect said second end of said pneumatic operating means (a) to said source of pressurized pneumatic fluid when said second solenoid valve is deenergized and (b) to said vent when said second solenoid valve is energized.

9. The apparatus defined in claim 8 wherein said electrical means is adapted to energize said first solenoid valve only when said electrical switch is in said first switch position, and to energize said second solenoid valve only when said electrical switch is in said third switch position.

10. The apparatus defined in claim 1 or 2 wherein said electrical switch is adapted to be adjustable among said first, second and third switch positions by the application thereto of a manual force, and wherein said electrical switch includes means for automatically positioning said switch in said second switch position in the absence of said manual force.

11. The apparatus as defined in claim 1 or 2 wherein said pneumatic means is adapted to rotatably adjust the position of said valve stem among said first, second and third valve stem positions.

12. The apparatus defined in claim 2 wherein said throttling valve is a slide valve and said throttling mechanism is a slidable gate element.

13. The apparatus defined in claim 3 or 4 wherein said venting means includes a first solenoid valve electronically connected to said electrical switch and fluid-tightly connected to said first end of said pneumatic operating means, and a second solenoid valve electrically connected to said electrical switch and fluid-tightly connected to said second end of said pneumatic operating means, said first and second solenoid valves being adapted, upon being energized, to vent pneumatic fluid from said first and second ends of said pneumatic operating means, respectively.

14. The apparatus defined in claim 3 or 4 further comprising a manual stick mechanically coupled to said valve stem and being adapted for manual control of the position of said valve stem.

15. The apparatus defined in claim 3 or 4 wherein said electrical switch is adapted to be adjustable among said first, second and third switch positions by the application thereto of a manual force, and wherein said electrical switch includes means for automatically positioning said switch in said second switch position in the absence of said manual force.

16. The apparatus defined in claim 3 or 4 wherein said pneumatic operating means is adapted to rotatably adjust the position of said valve stem among said first, second and third valve stem positions.

* * * * *